United States Patent [19]

Pyzik et al.

[11] Patent Number: 5,039,633

[45] Date of Patent: Aug. 13, 1991

[54] B4C/AL CERMETS AND METHOD FOR MAKING SAME

[75] Inventors: Aleksander J. Pyzik, Midland; Robert T. Nilsson, Traverse City, both of Mich.

[73] Assignee: The Dow Chemical Company, Midland, Mich.

[21] Appl. No.: 407,393

[22] Filed: Sep. 14, 1989

[51] Int. Cl.$^5$ ............................................. C22C 29/04
[52] U.S. Cl. ..................................... 501/93; 75/244; 75/238; 419/12; 419/16; 419/17; 419/27; 428/539.5; 501/87; 501/96
[58] Field of Search ...................... 419/12, 16, 27, 17; 501/96, 93, 87; 428/539.5; 75/238, 244

[56] References Cited

U.S. PATENT DOCUMENTS

| | | | |
|---|---|---|---|
| 2,946,700 | 7/1960 | Day | 428/539.5 |
| 3,864,154 | 2/1975 | Gazza et al. | 428/539.5 |
| 4,587,707 | 5/1986 | Nishida et al. | 428/539.5 |
| 4,702,770 | 10/1987 | Pyzik et al. | 75/236 |
| 4,718,941 | 1/1988 | Halverson et al. | 75/236 |
| 4,834,938 | 5/1989 | Pyzik et al. | 419/27 |
| 4,885,130 | 12/1989 | Claar et al. | 419/12 |
| 4,885,131 | 12/1989 | Newkirk | 419/12 |
| 4,904,446 | 2/1990 | White et al. | 419/13 |

*Primary Examiner*—Stephen J. Lechert, Jr.
*Assistant Examiner*—Leon Nigohosian, Jr.

[57] ABSTRACT

Reactive ceramic-metal compositions are described that include a ceramic phase of at least 70 percent by volume, 95 percent of theoretical density and a metal phase that retains its chemical reactivity with the ceramic phase after the composition has been fully densified. The composition may be heat treated after densification to form additional ceramic phases in a controllable manner. Preferred ceramic metal compositions wherein the metal and ceramic components retain reactivity after densification include boron carbide ceramic and Al or Mg metals. The process employed in forming said compositions requires first forming a sintered porous body of the ceramic material followed by contacting with the metal component, which may be in chip or solid bar form. The system is then heated to the melting point of the metal and a pressure of at least 200 MPa is employed such that the porous body is filled with metal and the composition is substantially fully densified. Subsequent heating reacts the metal with the ceramic to form additional B-C-metal phases as desired.

18 Claims, No Drawings

B4C/AL CERMETS AND METHOD FOR MAKING SAME

BACKGROUND OF THE INVENTION

The invention relates to ceramic-metal compositions or cermets. More particularly the invention relates to densified cermets that have selected desirable characteristics that are derived from the individual ceramic and metal starting components.

The potential of ceramic-metal compositions that include a unique combination of properties, such as the hardness of a ceramic material combined with the ductility of a metal, has long been of interest. It has, however, proved difficult to achieve cermet compositions that are fully densified and have a particularly desired range of properties. The difficulties arise from the conflicting physical and chemical nature of the starting materials.

Major areas of difficulties in processing of ceramic-metal composites are associated with:

(i) chemical reactivity of the starting materials resulting in oxidation and/or metal depletion and formation of undesirable phases between ceramic and metal; and (ii) non-wetting behavior of the metal with respect to the ceramic component.

Chemical reactions between composite ceramic and metal components that occur before density is achieved are often undesirable, because metal required for densification is reacted to form variety of phases. These cermet products will likely have a higher porosity than desired and lack sufficient quantities of desired ceramic-metal phases that would, if present, impart needed properties to the cermet.

Reactions after density is achieved can be beneficial because desired quantities of ceramic phases can be controllably developed to impart such qualities as hardness and wear resistance to resulting products.

Where articles having a high ceramic content are desired, in order to take advantage of the high hardness and wear resistance of the ceramic component, densification becomes particularly difficult. For example, in a highly reactive system such as $B_4C/Al$, achieving a fully densified composition is difficult because there is significant reaction of Al with $B_4C$ as the metal reaches a temperature where it wets the ceramic material and would otherwise completely fill the pores of or infiltrate into a porous ceramic body or preform.

Such densification difficulties led to an approach described by Pyzik, et al, in U.S. Pat. No. 4,702,770 wherein molten aluminum metal is infiltrated into a porous ceramic body of sintered $B_4C$, under vacuum conditions. The lower densification temperatures required for this process reduce unwanted $Al-B_4C$ reactions.

Alternatively, $B_4C-Al$ cermets may be obtained by infiltration of metal into chemically treated $B_4C$, such as described by Halverson et al., in U.S. Pat. No. 4,605,440 and U.S. Pat. No. 4,718,941. The advantage of Halverson's process is that the formation of a wide variety of ceramic B-C-Al phases having advantageous qualities is possible, although there is considerable difficulty in controlling the kinetics of chemical reactions and the final product character. A limitation of the Halverson process is that "packing efficiency" of the particulate ceramic in forming the porous ceramic body or green body necessary for infiltration is such that final product ceramic content is practically limited to $B_4C$ contents of about 66 volume percent.

Pyzik et al., in the aforementioned U.S. Pat. No. 4,702,770, avoids the requirement of chemically pretreating ceramic materials and the limitation of low ceramic content of the cermet by sintering the porous ceramic body prior to metal infiltration. The sintering step allows ceramic contents of 66 to 95 percent of theoretical(100%) density. However, the sintering step, as required by the U.S. Pat. No. 4,702,770 process, profoundly reduces the reactivity of the ceramic with respect to the metal at the infiltration temperatures of 1150°-1200° C. necessary to assure wetting and achieve penetration of metal into the porous ceramic body. As a result, the only major phases remaining in the densified cermet product are $B_4C$ and Al. For higher density $B_4C$ preforms, sintering temperatures above 2200° C. are required and at such temperatures, the system becomes so chemically stable that even prolonged contact with aluminum does not result in significant reaction and formation of ceramic phases. While these $B_4C-Al$ cermets do achieve higher ceramic contents, control of the chemical reactivity of the metal-ceramic systems, permitting formation of advantageous B-C-Al phases, is lost.

Thus, two general types of $B_4C-Al$ cermets are known in the art heretofore. One type of $B_4C-Al$ cermet is characterized by high reactivity for forming B-C-Al phases and low, less than 70 volume percent, ceramic content. The second type of $B_4C-Al$ cermet is characterized by low reactivity for developing desired ceramic phases and high, greater than 70 percent, ceramic content.

In light of the deficiencies of the known $B_4C-Al$ cermets, it would be desirable to produce ceramic-metal compositions of reactive ceramic metal systems that have substantially greater ceramic content than 70 volume percent, are substantially fully densified and retain sufficient reactivity of the ceramic with respect to the metal to allow the controlled formation of further advantageous ceramic phases by subsequent processing.

SUMMARY OF THE INVENTION

The invention is a densified reactive ceramic-metal composition or cermet that comprises a ceramic phase that is permeated with a metal phase, wherein said ceramic phase comprises at least 70 percent by volume of said composition and said composition is at least about 95% of theoretical density. The cermets of the invention are further characterized by a metal phase that is, subsequent to densification, reactive with the ceramic phase. Such compositions, after densification, may be heat treated to form additional ceramic phases in a controllable manner. Preferred ceramic metal compositions wherein the metal and ceramic are reactive, comprise, for example, $B_4C-Al$ or $B_4C-Mg$. Preferably, the $B_4C$ ceramic phase comprises 70 to 90 volume percent of said composition, and most preferably, 80 to 95 volume percent $B_4C$ ceramic. The cermets of the invention are particularly characterized by their greater hardness in comparison with cermets prepared by the infiltration methods of the prior art.

The densified, ceramic-metal compositions of the invention are prepared by a process that includes first forming a sintered porous body from a particulate ceramic powder. Following contacting the porous body with the metal, the process requires heating the metal and ceramic porous body to liquefy the metal. The process then requires applying pressure to the liquefied metal such that the metal is forced into, infiltrates and completely fills the pores of the porous body. The resulting ceramic-metal composition is fully densified. An advantage of the application of external force to the liquefying metal is that lower temperatures are required to densify the composition of the invention. For a preferred $B_4C$-Al system, liquid metal-ceramic is introduced into the sintered $B_4C$ at below the metal wetting temperature, resulting in a substantially fully dense cermet having high post-densification chemical reactivity. Thus, a preferred composition of the invention, after post-densification heat treatment, is a $B_4C$-Al cermet having a $B_4C$ content of greater than 70 volume percent, a B-C-Al phases content and a desired content of unreacted metal.

DETAILED DESCRIPTION OF THE INVENTION

The cermet composition of the invention includes a high ceramic component content such that the cermet is characterized by high hardness, with respect to cermets of the prior art, while maintaining significant fracture toughness and flexural strength. The fracture toughness is above 6.5 $MPa \cdot m^{\frac{1}{2}}$. The particular advantages achieved for a given ceramic-metal system depend upon the characteristics of the individual components selected.

The preferred ceramic component of the composition of the invention is $B_4C$ which is characterized by high hardness and superior wear resistance.

The metal component of the composition of the invention is selected, in general, to impart toughness or ductility to the ceramic material. Preferred metal-ceramic systems are $B_4C$-Al or $B_4C$-Mg, for example.

The invention provides a process for producing the above-described cermets of the invention that are characterized by high continuity of ceramic phase and high ceramic content. The process produces products that retain a residual reactivity such that upon application of post-densification heat treating steps, the formation of additional ceramic-containing phases is possible.

The process first requires forming a porous body preform or greenware article from a ceramic particulate. In general, a fine ceramic powder, preferably having a particle diameter size range of 0.1 to 10 micrometers, is utilized. Ceramic materials in the form of platelets or whiskers may also be used. As is conventional, the particulate material is dry mixed or dispersed in a liquid followed by consolidation to form the porous green body.

The greenware is next sintered to achieve a ceramic content above 70 volume percent. Where the ceramic is $B_4C$, the greenware is sintered at about 2000° C. or higher to form porous compacts or preforms having a density ranging from greater than 70 to 90 percent of theoretical density.

The process then requires that the sintered porous preform be contacted with the selected metal component of the cermet and heated to at least about the liquefication temperature of the metal. Heating may take place in a vacuum or under an inert gas. Where the system of interest is $B_4C$-Al, the porous preform is heated above metal melting temperature, but not higher than about 1100° C., which is about the temperature at which Al wets $B_4C$. The metal placed in contact with the porous body prior to liquefaction may be in the form of a particulate or solid bars or chips or any other suitable form.

Pressure is applied to the liquid metal such that the metal is pushed into the porous body structure of the porous compact or preform. Generally, any pressure technique that exerts at least about 200 MPa on the metal is suitable. An external force or pressure is required to contain the preform when densities of products higher than 97 percent of theoretical density are required.

For the reactive $B_4C$-Al system, an unexpected result is that, at densification temperatures below 1100° C., the resulting densified cermets of the invention retain a controllable chemical reactivity, in contrast to prior art systems. Thus, further heat treatment of the densified cermet is capable of forming a high content of B-C-Al phases in the cermet. For example, the resulting densified microstructure, consisting of a two-phase network of $B_4C$-$AlB_{24}C_4$, interpenetrated with aluminum metal, can be post-depleted, by heating to 800° C., of Al metal in a desirable amount to form mainly $AlB_2$ and $Al_4BC$. The hardness of the cermet and all of the properties related to hardness increase during the post densification heat treatment.

Reactive cermet products are produced when the chemically stable, high temperature-sintered $B_4C$ is pressure densified with Al at 660° C. but below 1100° C. The result is an unexpected achievement regarding the $B_4C$-Al system. It is well known that there is a direct correlation between temperature and rate of diffusion such that increasing temperature increases the rate of diffusion. One skilled in the art would expect that increasing the temperature at which the prior art vacuum infiltration occurs, that is, above the wetting temperature of Al for $B_4C$, between 1100° and 1200° C., would increase the reactivity of the resulting $B_4C$-Al system. In the work leading to the present invention, it was discovered that the opposite result occurs, that is, the sintered $B_4C$ becomes much more stable and unreactive. The present invention solves the problems of the lack of reactivity of $B_4C$ and Al after densification, in addition to overcoming the low ceramic content characteristic of prior art reactive ceramic-metal compositions.

The following examples further define, but are not intended to limit the scope of the invention.

EXAMPLE 1

$B_4C$ (ESK specification 1500, manufactured by Elektroschemeltzwerk Kempten of Munich, Germany, and having an average particulate size of 3 micrometers) powder was dispersed in water at pH 6.5. The suspension was cast on a plaster of Paris mold to form a porous ceramic body having a density of 63 volume percent of theoretical (100%) density. The $B_4C$ greenware was dried for 24 hours at 105° C. and then sintered at 2250° C. for 30 minutes in a graphite element furnace to a density of 82 volume percent of theoretical. The resulting preform was cut into two parts. The first part was filled with molten aluminum (a specification 6061 alloy, manufactured by Aluminum Company of America that is a commercial grade of aluminum, comprising less than 4 percent alloying metals) by using the prior art vacuum infiltration process at 1180° C. for 30 minutes. The second part of the $B_4C$ preform was filled with the 6061Al alloy, in accord with the present invention, by applying pressure at 700° C. A pressure of 830 MPa was used. Both parts were then heat treated at 800° C. to deplete remaining metal. Vickers hardness was measured using a Vickers indentor and 30 pound (13.6 kg) load. Hardness as a function of the heat-treatment time is shown in Table 1. The metal content of the cermet during processing was monitored by the differential thermal colorimetry technique and data are presented in Table 2.

TABLE 1

Hardness as a Function of Time at 800° C.
Heat Treatment After Densification/Infiltration

| Time [Hrs] | Vickers Hadness [Kg/mm$^2$] | |
| --- | --- | --- |
| | Pressure[1] densification | Vacuum[2] Infiltration |
| 0 | 1413 | 1200 |
| 10 | 1641 | 1230 |
| 20 | 1684 | 1195 |
| 30 | — | 1240 |
| 40 | 1774 | 1250 |

[1]Pressure densification at 830 MPa - product and process of the invention
[2]Comparative vacuum infiltration process - not of the invention

TABLE 2

Metal Remaining in Cermet After Heat Treatment, Following Metal Densification/Infiltration

| | Amount of Al introduced to the System (Vol %) | Amount of Metal After densification Process (Vol %) | Amount of Metal after Heat-treatment at 800° C. (Vol %) |
| --- | --- | --- | --- |
| Comparative Vacuum[1] Infiltration | 30 | 26 | 25 |
| Pressure[2] densification | 30 | 23 | 10 |

[1]Comparative vacuum infiltration process - not of the invention
[2]Pressure metal infiltration - product and process of the invention

EXAMPLE 2

A porous greenware body of B$_4$C was prepared and sintered as described in Example 1. Then, samples were filled with Al by using vacuum infiltration of the prior art and the pressure densification process of the invention. A B$_4$C-Al cermet having a density of 82 volume percent of theoretical 100 volume percent was produced. The mechanical properties of the densified products are presented in Table 3.

TABLE 3

| Mechanical Properties of Example 2 Cermets | | | |
| --- | --- | --- | --- |
| | Strength[1] (MPa) | Toughness[2] (MPa m$^{\frac{1}{2}}$) | Hardness[3] (kg/mm$^2$) |
| Comparative Vacuum infiltration | 480 | 7.19 | 1200 |
| Pressure Infiltration, Process of Invention | 440 | 6.93 | 1413 |

[1]4-point bend test according to Military Standard 1942
[2]Chevron notch method
[3]Vickers microhardness method using 30 pound (13.6 kg) load.

Table 3 shows the improved hardness of the product of the invention, while strength and toughness are insignificantly slightly lower than the comparative process products.

What is claimed is:

1. A densified reactive ceramic-metal composition comprising:
   a ceramic phase wherein said ceramic phase is a sintered porous body which comprises before densification more than 70 percent by volume of said composition; and
   a metal phase which permeates without wetting said ceramic phase wherein said metal after densificaton remains reactive with said ceramic phase such that new ceramic-metal phases can be formed,
   wherein said composition is at least about 95 percent of theoretical density.

2. A densified reactive ceramic-metal composition, comprising:
   a ceramic phase wherein said ceramic phase comprises before densification 80-95 volume percent of said composition; and
   a metal phase permeating said ceramic phase wherein said metal after densification remains reactive with said ceramic phase such that new ceramic-metal phases can be formed,
   wherein said composition is at least about 95 percent of theoretical density.

3. The composition of claim 2 wherein said ceramic-metal composition after densification is heat treated such that additional ceramic phases are formed therein.

4. The composition of claim 2 wherein said ceramic-metal composition comprises B$_4$C-Al or B$_4$C-Mg.

5. The composition of claim 2 wherein said ceramic phase is a porous body that is sintered prior to infiltration.

6. The composition of claim 5 wherein said porous body is sintered at greater than 2000° C.

7. The composition of claim 3 characterized by a fracture toughness that is above 6.5 MPa·m$^{\frac{1}{2}}$.

8. The composition of claim 3 wherein said metal and ceramic are reacted to form B-C-metal phases.

9. The composition of claim 8 wherein said densified composition comprises a two-phase network of B$_4$C-AlB$_{24}$C$_4$ interpenetrated with aluminum metal and said metal is subsequently reacted with said ceramic phase network to form mainly AlB$_2$ and Al$_4$BC.

10. The composition of claim 3 comprising about 5-30 volume percent metal after densification an 1.0-10 volume percent metal after said metal and ceramic are reacted.

11. A process for making a densified reactive ceramic-metal composition, comprising:
    forming a porous body from a particulate ceramic powder;
    sintering said porous body at 2000° C. or greater;
    contacting said porous body with a metal;
    heating said ceramic and metal to a temperature that liquefies said metal, but is below the temperature at which said metal wets said ceramic; and
    applying pressure to said liquefied metal such that said metal is forced into and substantially completely fills the pores of said porous body and said ceramic-metal composition is fully densified,
    wherein said metal remains reactive with said ceramic phase such that additional ceramic-metal phases can be formed.

12. The process of claim 11 wherein said pressure is at least about 200 MPa.

13. The process of claim 11 wherein said ceramic is B$_4$C and said metal is Al.

14. The process of claim 13 wherein heating said metal in contact with said ceramic is at about 660° to 1200° C.

15. The process of claim 13 wherein additional B-C-metal phases of said densified ceramic-metal composition are formed by heating said composition at about 900° C. for about 25 hours.

16. The process of claim 15 wherein said heating is at about 800° C. for about 20 hours.

17. The composition of claim 1 having, subsequent to post-densification heat treatment at 800° Centigrade, a residual metal content which is substantially lower than that of a like composition wherein the metal phase permeates the ceramic phase with wetting.

18. The composition of claim 17 wherein the residual metal content is less than one-half that of the like composition.

* * * * *